United States Patent [19]

Schneiders et al.

[11] 3,714,814
[45] Feb. 6, 1973

[54] TIGHT VISCOSIMETER WORKING IN AGGRESSIVE MEDIA

[75] Inventors: Albert M. Schneiders, Angera; Peter Schiller, Gavirate; Gustave L. Hollebeck, Ispra; Friedhelm Diletti, Gemonio, all of Italy

[73] Assignee: European Atomic Energy Community (Euratom), Kirchberg, Luxembourg

[22] Filed: April 23, 1970

[21] Appl. No.: 31,346

[30] Foreign Application Priority Data

April 29, 1969 Luxembourg ........................... 58532

[52] U.S. Cl. ....................................................... 73/54
[51] Int. Cl. .............................................. G01n 11/16
[58] Field of Search ........................... 73/54, 59, 32

[56] References Cited

UNITED STATES PATENTS 2,607,217  8/1952  Merten et al. ............................. 73/54
3,382,706  5/1968  Fitzgerald et al. ..................... 73/54 X Primary Examiner—Louis R. Prince
Assistant Examiner—Joseph W. Roskos
Attorney—Stevens, Davis, Miller & Mosher

[57] ABSTRACT

A viscosimeter for measuring the viscosity of fluids or suspensions especially those which may be inherently dangerous such as radioactive fluids. The fluid is placed in a sealed casing with a cylindrical body inside. The casing is resiliently suspended for axial oscillation in a sheath which can be evacuated. Means such as a solenoid are provided to oscillate the casing. Means outside the sealed area to measure the damping of the oscillations of the cylindrical body are also provided.

11 Claims, 2 Drawing Figures

PATENTED FEB 6 1973

3,714,814

ALBERT M. SCHNEIDERS
PETER SCHILLER
GUSTAVE L. HOLLEBECK
FRIEDHELM DILETTI
INVENTORS

BY *Stevens, Davis, Miller & Mosher*
ATTORNEYS

TIGHT VISCOSIMETER WORKING IN AGGRESSIVE MEDIA

The invention relates to a viscometer for measuring the viscosity of fluids or suspensions and especially but not exclusively for measuring the viscosity of fluids or suspensions which may be dangerous in themselves (e.g., radioactive) or for performing the measurement in dangerous surroundings.

The requirements of such measuring conditions are probably closely met by the viscometer described by L.J. Wittenberg, L.V. Jones and D. Ofte in the paper entitled: "Properties of plutonium-based fuels" at the Second Conference on Plutonium held at Grenoble on the 19th and 20th of April 1960. The viscometer has a rotary oscillating receptacle in which a cylindrical receptacle containing the liquid whose viscosity is to be measured is suspended from a torsion wire. The damping of the normal oscillations of the resulting torsional pendulum, due to the deceleration of the liquid, depends on the viscosity thereof, so that such damping gives the measurement of viscosity. The receptacle can be disposed in a furnace, thus enabling the viscosity of liquids to be measured at elevated temperatures.

The viscometer described allows the satisfactory measurement of the viscosity of liquids which may be dangerous, such as a plutonium-iron eutectic alloy, but it has a number of disadvantages; the oscillatory system must preferably operate in vacuo, or at any rate in surroundings which do not disturb the oscillatory movements of the receptacle; moreover, the viscometer described hereinbefore is not suitable for use in special or dangerous surroundings such as the core of a nuclear reactor or enclosures subjected to very severe internal physical and/or chemical conditions.

Nor is such a viscometer suitable for measuring the viscosity of suspensions, since it cannot include a fluid-agitating device contained in the receptacle and filling it completely.

The variation in the damping of the oscillations in dependence on the viscosity of the fluid cannot be used with all the required guaranteed sensitivity, since the curve expressing such variation is not highly sensitive to damping effects, even in its most inclined portion. Moreover, the range of relatively precise measurements is difficult to determine.

The very principle on which the afore-mentioned viscosity is based also makes it rather impractical, since the inertia of the fluid depends on the frequency of oscillation of the receptacle and the viscosity of the fluid, so that both damping and frequency must be measured, which introduces the risk of further errors.

Moreover, the authors themselves state (cf. page 679 of the English-language version of the proceedings of the afore-mentioned Conference at Grenoble) that satisfactory viscosity values cannot be obtained adjacent the maximum of the curve of the delta damping of the recipient oscillations in dependence on $\sqrt{\eta}$.

Lastly, this prior art apparatus must be disposed in a precisely vertical position screened from vibrations, inter alia to prevent the casing from touching the furnace walls.

The viscometer according to the invention, which relates or obviates these disadvantages, is characterized by: a fixed sealing-tight substantially vertical cylindrical sheath containing a coaxial sealing-tight cylindrical casing resiliently suspended from the sheath so that the casing can be oscillated axially, the casing being filled with the fluid whose viscosity is to be measured and containing a cylindrical body coaxial with the casing and resiliently suspended therefrom so that it can oscillate inside the casing axially thereof; intermittently operable means for exciting vertical axial oscillations of the casing; and means enabling the damping of the oscillations to be measured outside the phases of excitation, the space between the sheath and the casing being evacuated or filled with a fluid whose friction is less than that of the fluid whose viscosity is to be measured.

The invention will be more clearly understood from the following description of a specific embodiment thereof the description making reference to the accompanying drawings, wherein.

Figure 1:
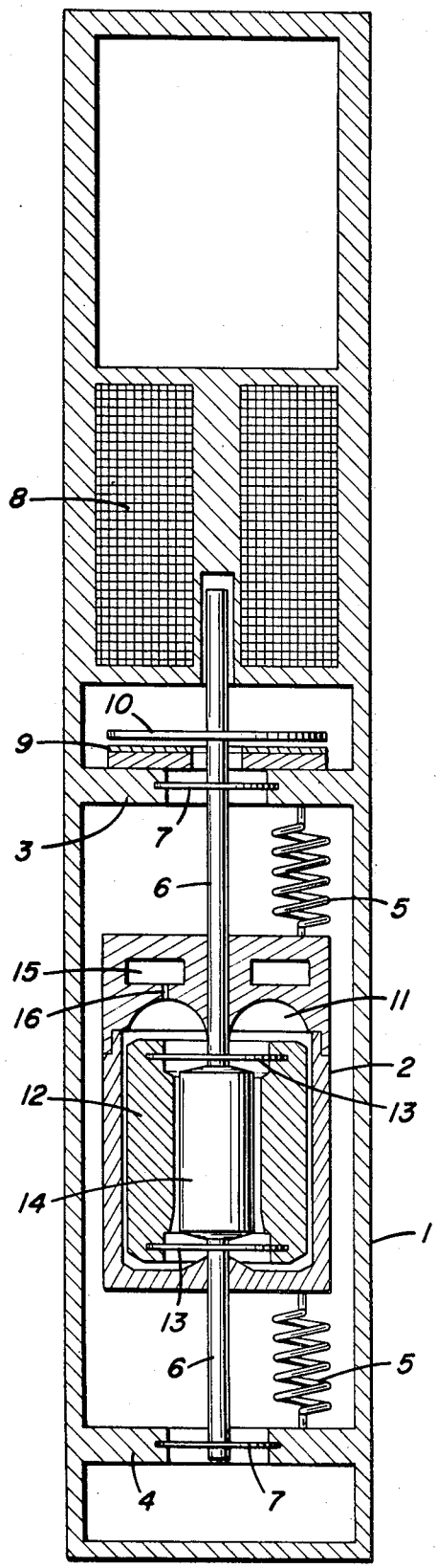
FIG. 1 is an axial section through a viscometer according to the invention.

FIG. 1 shows a sealing-tight cylindrical outer sheath 1, attached to any support (not shown) so that its axis is vertical. Resiliently suspended inside the sheath 1 is a sealing-tight cylindrical casing 2 coaxial with the sheath 1. Suspension can be effected in any way enabling the casing 2 to be oscillated vertically and without twisting inside the sheath 1 by any control system. FIG. 1 shows one possible embodiment of the suspension; the casing 2 is attached to inner flanges 3, 4 of the sheath 1, which are disposed on either side of the casing 2, by helical springs 5 attached to the casing ends and regularly distributed over their peripheries. In this particular embodiment, the casing 2 is further continued by an axial rod 6 which extends completely through the casing 2. The rod 6 is also attached to the centers of flat disc springs 7 whose peripheries are attached to the flanges 4. The flat springs 7, as well as suspending the casing 2 resiliently, center the casing satisfactorily in the sheath and prevent the casing from rotating.

One of the ends of the axial rod (the upper end as shown in FIG. 1) is made of a magnetizable material and extends into the center of a coil 8 for exciting vertical oscillations in the casing. The oscillations and their damping are measured, for instance, by a capacitor device one of whose plates 9 is attached to one of the flanges 3, the other plate 10 being attached, parallel to the plate 9 to the rod 6.

The casing 2 contains a cavity 11 adapted to be filled with the fluid whose viscosity is to be measured. Within the fluid there is a cylindrical body 12 coaxial with the casing 2 and with the sheath 1. In this embodiment of the apparatus the cylindrical body is in the form of a sleeve or annulus and encloses the axial rod 6. The cylindrical body 12 is resiliently suspended from the casing 2 so that it can oscillate axially inside the casing 2. In the present example the suspension is effected by means of flat springs 13 disposed at each of the cylindrical body ends. The cylindrical body is of a size such that its lateral wall is close enough to the casing wall to produce satisfactory deceleration of its oscillations inside the casing as a result of the frictional forces set up by the fluid whose viscosity is to be measured.

The casing 2 can also contain an expansion cavity 15 communicating with the cavity 11 in the capsule via a narrow passage 16. The expansion cavity 15 may be useful in cases in which the fluid filling the cavity 11 is subject to expansion or radiolysis. A further safety device can be added: a conduit (not shown) with which the rod 6 is formed axially as far as its end which does not extend into the coil 8 and communicates with the expansion cavity 15. A receptacle (not shown) can be attached to the end of the rod 6, the receptacle being connected to the cavity 15 via the aforementioned conduit and closed by a safety diaphragm adapted to yield when pressure becomes excessive.

The space between the sheath 1 and the casing 2 is either evacuated or filled with a fluid whose friction is less than that of the fluid whose viscosity is to be measured.

In the viscometer just described, when the coil 8 makes the casing 2 reciprocate vertically, the cylindrical body 12 is also reciprocated vertically inside the casing 2. Clearly, the movements of the casing and the cylindrical body are not independent of one another, but are coupled by the resilient forces of the springs 13 and frictional forces set up by the viscosity of the fluid in the casing. Reference numeral 14 indicates an enlarged part of rod 6 which is sometimes needed to present a narrow passage for the fluid of which the viscosity is being measured.

For certain readily determinable frequencies of oscillation — resonance frequencies — the oscillations of the capsule become considerable (of the order of 1 mm) and can then readily be measured by the capacitor device 9, 10. Outside the periods during which excitation takes place, the oscillations are damped. Their damping $\delta$ gives a measurement of the viscosity of the fluid, by means of the formula (A)

$$(K'_1C'_2 + K'_2C'_1 + \alpha\beta)(K'_1C'_2 + K'_2C'_1 + 2a_1\alpha) = K'_1 K'_2(\alpha\kappa - 2a_1)^2$$

where:
$\beta = C'_1 + C'_2 m - 2 a_1$
$\alpha = 2 a_1 - K'_1 - K'_2 m - C'_1 33\ C'_2$ $m = 1 + (m_2/m_1)$     $a_1 = \delta f$
$K'_1 = K_1/m_1$     $K'_2 = (K_2/m_2)$
$C'_1 = C_1/m_1$     $C'_2 = C_2/m_2 = A \cdot \eta$ $f$ = resonance frequency at which the measurement is made.
$A$ = constant, dependent on the distance between the casing side walls and the cylindrical body, and the height and diameter of the cylindrical body.
$\delta$ = damping of the oscillations.
$K_1$ = constant of the casing suspension in dynes/cm.
$K_2$ = constant of the cylindrical body suspension in dynes/cm.
$C_1$ = frictional force set up by the fluid enclosing the casing (grams/sec).
$C_2$ = frictional force set up by the fluid whose viscosity is to be measured.
$m_1$ = mass of the casing plus that of the fluid whose viscosity is to be measured.
$m_2$ = mass of the cylindrical body multiplied by a correctional factor due to the acceleration of the liquid.

The use of formula (A) raises no special problems, but it is much easier and quicker to use a calibration curve of the apparatus according to the invention. The calibration curve always takes the form shown in FIG. 2, in which the logarithm of viscosity is plotted on the x-axis and the logarithm of the damping $\delta$ on the y-axis.

If the fluid whose viscosity is to be measured is to be mixed (for instance, a suspension of solid particles in a liquid), the viscometer just described still serves the purpose fully adequately, since the coil 8 can be excited at a different resonance frequency at which the amplitude of the oscillations of the casing no longer reaches a peak, but the amplitude of the oscillations of the floater inside the casing does. If the fluid in the casing must be mixed, the space between the cylindrical body ends and the top and bottom end walls is advantageously not excessive, so that the cylindrical body may abut thereagainst, the springs 13 being therefore protected from excessive deformations which might break them.

A sequence to be used for measuring the viscosity of fluids which must be mixed therefore consists in:

1. Exciting the coil at the resonance frequency at which the amplitude of the oscillations of the cylindrical body inside the cavity 11 is at the peak;
2. Exciting the coil at the resonance frequency at which the oscillations of the casing 2 inside the sheath 1 are considerable;
3. In the absence of all excitation, measuring the damping $\delta$ from which the viscosity can readily be deduced by one of the two methods set forth hereinbefore.

The apparatus described hereinbefore has a certain number of advantages; for instance, it need not be disposed with its axis precisely vertical—a few degrees of deviation produce an error of only a few percent in the measured result.

Figure 2:
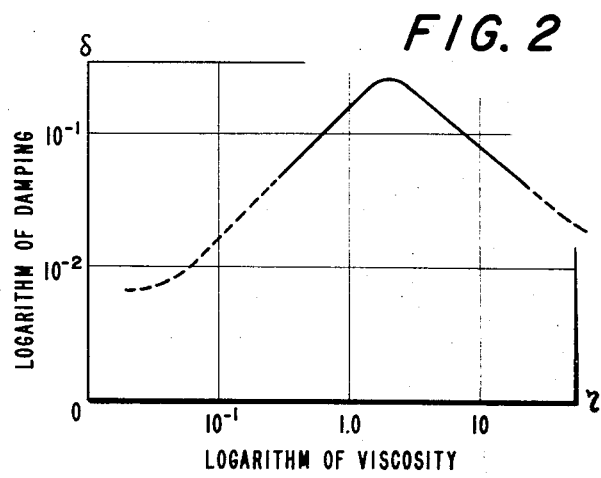
FIG. 2 shows by way of example, to a double logarithmic scale, a calibration curve of the viscometer shown in FIG. 1.

Moreover, the flow section of the liquid is always identical for different viscosities, so there is no difficulty in calculating the rectilinear portions of the curve shown in FIG. 2.

As already stated, the liquid can be mixed before measuring, without further handling or apparatus.

During measurement, the natural logarithm of the amplitude is recorded in dependence on time. If the fluid whose viscosity is to be measured is Newtonian, the recorded curve takes the form of a straight line. Without any further steps being taken, therefore, any deviation will show that the fluid is not Newtonian.

The viscometer according to the invention can be used in very severe experimental conditions, for instance, in a nuclear reactor duct or in any surroundings which are aggressive or inaccessible to the operator. The viscometer is moreover relatively insensitive to parasite vibrations. The fluid whose viscosity is to be measured can be dangerous and at a wide range of temperatures.

Clearly, the invention is not limited to the embodiment disclosed. For instance, the casing and the cylindrical body can be suspended in many different ways, on condition that they can be oscillated longitudinally and remain centered in the same way in relation to one another, and that torsional vibrations are avoided so far as is practicable. Similarly, the oscillations can be excited and measured by a method different from the

We claim:

1. A viscometer comprising a fixed sealing-tight substantially vertical cylindrical sheath containing a coaxial sealing-tight cylindrical casing resiliently suspended from the sheath so that the casing can be oscillated axially, the casing being filled with the fluid whose viscosity is to be measured and containing a cylindrical body coaxial with the casing and resiliently suspended therefrom so that it can oscillate inside the casing axially thereof; intermittently operable means for exciting vertical axial oscillations of the casing; and means enabling the damping of the oscillations to be measured outside the phases of excitation, the space between the sheath and the casing being evacuated or filled with a fluid whose friction is less than that of the fluid whose viscosity is to be measured.

2. A viscometer as set forth in claim 1 in which the casing encloses tHe cylindrical body at a distance small enough to enable the frictional forces set up by the fluid whose viscosity is to be measured substantially to damp the oscillations.

3. A viscometer as set forth in claim 2, in which the lateral walls of the cylindrical body are disposed opposite the inner walls of the casing at a distance small enough to enable the frictional forces set up by the fluid whose viscosity is to be measured substantially to damp the oscillations.

4. A viscometer as set forth in claim 1 in which the casing is suspended and retained in place inside the sheath by vertical helical springs regularly distributed and attached to the horizontal ends of the casing and to internal anchorages in the sheath, a device being provided to keep the casing centered inside the sheath.

5. A viscometer as set forth in claim 1 in which the casing is continued on either side of its end faces by an axial rod which extends completely through the casing, the cylindrical body taking the form of a sleeve enclosing the axial rod.

6. A viscometer as set forth in claim 5, in which flat springs are attached by their peripheries to the sheath and by their centers to the axial rod.

7. A viscometer as set forth in claim 5 in which the cylindrical body is suspended from the axial rod by two flat springs whose outer peripheries are attached to the cylindrical body and whose centers are attached to the axial rod.

8. A viscometer as set forth in claim 1 in which the sheath contains a coil for exciting the oscillations, one end of an axial rod, which end is made of a magnetizable material, extending into the center of the coil, and the rod being fixed to the casing.

9. A viscometer as set forth in claim 1 in which means for measuring the damping of the oscillations comprise a capacitor of which one plate is attached to the sheath and the other plate is attached to the casing, the plates being perpendicular to the vertical oscillations.

10. A viscometer as set forth in claim 1 in which the cylindrical body has an expansion chamber above the area occupied by the fluid whose viscosity is to be measured.

11. A viscometer as claimed in claim 1 in which the frequency of the oscillations excited, is variable.

* * * * *